US010499462B2

(12) United States Patent
Chang et al.

(10) Patent No.: US 10,499,462 B2
(45) Date of Patent: Dec. 3, 2019

(54) ON-LINE INDUCTION HEATING DEVICE FOR WHEEL BLANK

(71) Applicant: CITIC Dicastal CO., LTD, Qinhuangdao (CN)

(72) Inventors: Haiping Chang, Qinhuangdao (CN); Zhixue Wang, Qinhuangdao (CN); Jin Zhang, Qinhuangdao (CN); Rui Li, Qinhuangdao (CN); Dawei Xu, Qinhuangdao (CN); Bowen Xue, Qinhuangdao (CN); Changhai Li, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 357 days.

(21) Appl. No.: 15/693,940

(22) Filed: Sep. 1, 2017

(65) Prior Publication Data

US 2018/0338353 A1 Nov. 22, 2018

(30) Foreign Application Priority Data

May 22, 2017 (CN) .......................... 2017 1 0361711

(51) Int. Cl.
*H05B 6/10* (2006.01)
*H05B 6/06* (2006.01)
(Continued)

(52) U.S. Cl.
CPC ............. *H05B 6/102* (2013.01); *B21D 22/14* (2013.01); *B21D 37/16* (2013.01); *B21D 53/30* (2013.01);
(Continued)

(58) Field of Classification Search
CPC . H05B 6/102; H05B 6/40; H05B 6/42; B21D 22/14; B21D 53/30; B21D 37/16; B22D 18/04
(Continued)

(56) References Cited

U.S. PATENT DOCUMENTS 4,567,649 A * 2/1986 Ades ..................... B23P 11/025 219/391
4,570,053 A * 2/1986 Ades ..................... B23P 11/025 219/385
(Continued)

FOREIGN PATENT DOCUMENTS

CN 104493142 A 4/2015
CN 105921723 A 9/2016
JP 5504516 B2 5/2014

*Primary Examiner* — Quang T Van
(74) *Attorney, Agent, or Firm* — Calfee, Halter & Griswold

(57) ABSTRACT

The present application discloses an on-line induction heating device for a wheel blank, consisting of a frame, a servo motor, guide posts I, guide sleeves I, a lower fixed plate, a lifting top plate, a bearing seat, a jacking cylinder, a piston connecting rod, a top cone, reset springs, radial positioning blocks, upper fixed plates, induction heating cylinders, connecting rods, double-head fastening nuts, fixed slide rails, mounting plates, outer protective jackets, induction coils, a displacement sensor I, a compression cylinder, a guide sleeve II, a guide post II, a gland, pressure sensors, asbestos, a displacement sensor II, water inlet pipes, water outlet pipes, a roller bed, transverse sliding tables, positioning cylinders, a supporting plate and lifting cylinders.

1 Claim, 2 Drawing Sheets

(51) Int. Cl.

| | |
|---|---|
| ***B23P 11/02*** | (2006.01) |
| ***B21D 22/14*** | (2006.01) |
| ***B21D 53/30*** | (2006.01) |
| ***B21D 37/16*** | (2006.01) |
| ***H05B 6/40*** | (2006.01) |
| ***H05B 6/42*** | (2006.01) |
| *B22D 18/04* | (2006.01) |

(52) U.S. Cl.
CPC ................. *H05B 6/40* (2013.01); *H05B 6/42* (2013.01); *B22D 18/04* (2013.01)

(58) Field of Classification Search
USPC ....... 219/635, 633, 600, 663, 676, 395, 405, 219/410, 407, 415, 422, 413, 385; 99/451; 29/252, 259, 447, 705, 709, 720, 29/800; 426/405
See application file for complete search history.

(56) References Cited

U.S. PATENT DOCUMENTS

| | | | | |
|---|---|---|---|---|
| 6,818,872 | B2 * | 11/2004 | Mitamura | B29C 35/0272 219/635 |
| 9,693,397 | B2 * | 6/2017 | Doyon | C21D 1/10 |

* cited by examiner

ON-LINE INDUCTION HEATING DEVICE FOR WHEEL BLANK

CROSS-REFERENCE TO RELATED APPLICATIONS

This application claims priority to Chinese Patent Application No. 201710361711.5 filed on May 22, 2017, which is hereby incorporated by reference in its entirety.

TECHNICAL FIELD

The present application relates to an induction heating device, and specifically to an on-line induction heating device for a wheel blank.

BACKGROUND ART

Cast spun aluminum wheels are aluminum alloy wheels having spokes cast under low pressure and rims formed by adopting a powerful spinning technology, are widely applied in the field of cars due to the advantages of light weight, energy conservation, good comfort, attractive appearance and the like, and are made of A356 alloy. The casting blank needs to be heated to over 350 □ in an industrial furnace, and then the rim can be spun. In the present heating mode, the overall cooled casting blank is heated in the industrial gas furnace, and the temperatures of the spoke and other similar parts which do not need spinning also rise, so that the strength is reduced, the spoke and the other similar parts are easily seriously deformed after spinning, the yield is reduced, and the manufacturing cost is improved. Meanwhile, the industrial furnace has the defects of large area occupation, low heating efficiency, long maintenance time and the like.

In order to realize a green lightweight short-flow aluminum alloy wheel manufacturing technology, reduce the manufacturing cost, realize direct spinning of the blank after casting and sufficiently utilize the waste heat of the casting blank, it is very necessary to develop an on-line blank heating device and establish a short-flow production line, thereby realizing upgrade of the aluminum wheel production technology.

SUMMARY OF THE INVENTION

The present application is aimed at providing an on-line induction heating device for a wheel blank. The device not only may realize on-line heating of the rim of the wheel blank, but also effectively utilizes the waste heat of the casting blank, saves energy, realizes a green short-flow manufacturing technology for an aluminum alloy cast spun wheel, improves the production efficiency and reduces the manufacturing cost.

In order to fulfill the above aim, the present application adopts the following technical solution: on-line induction heating device for a wheel blank includes a frame, a servo motor, guide posts I, guide sleeves I, a lower fixed plate, a lifting top plate, a bearing seat, a jacking cylinder, a piston connecting rod, a top cone, reset springs, radial positioning blocks, upper fixed plates, induction heating cylinders, connecting rods, double-head fastening nuts, fixed slide rails, mounting plates, outer protective jackets, induction coils, a displacement sensor I, a compression cylinder, a guide sleeve II, a guide post II, a gland, pressure sensors, asbestos, a displacement sensor II, water inlet pipes, water outlet pipes, a roller bed, transverse sliding tables, positioning cylinders, a supporting plate and lifting cylinders.

The two lifting cylinders and the two guide sleeves I are fixed on the lower fixed plate, the output ends of the lifting cylinders are articulated with the lower part of the lifting top plate, and the guide posts I matched with the guide sleeves I are fixed below the lifting top plate; the bearing seat is fixed above the lifting top plate, the servo motor is fixed below the lifting top plate, and the output end of the servo motor is connected with a shaft installed in the bearing seat.

A four-jaw chuck jointly formed by the top cone, the reset springs, the radial positioning blocks, the positioning cylinders, the transverse sliding tables and the supporting plate is installed in the bearing seat via a bearing; the supporting plate is fixed at the upper end of the shaft, and the four transverse sliding tables matched with the top cone are installed above the supporting plate. The four reset springs are installed at the tail ends of the transverse sliding tables; the four radial positioning blocks are fixedly connected with levers of the positioning cylinders; the positioning cylinders penetrate the supporting plate and are installed on the transverse sliding tables, and the positions of the positioning cylinders can be adjusted according to the size of the wheel; and the jacking cylinder realizes synchronous action of the four radial positioning blocks via motion of the piston connecting rod and the top cone.

The left induction heating cylinder and the right induction heating cylinder are installed on the fixed slide rails, the fixed slide rails are provided with hollow structures in the middle and can move up and down, and the induction heating cylinders can be adjusted according to the length of the wheel rim, so that the induction coils are opposite to the rim of the wheel blank. The two fixed slide rails are welded with the upper fixed plates together, and the upper fixed plates are fixed on the frame.

The two induction coils are respectively wound into semicircles and fixed by the semicircular outer protective jackets, the outer protective jackets are connected with the mounting plates, and the connected angles can be changed to adapt to angle parallelism of the induction coils and the rim; connecting rods for connecting the mounting plates and the induction heating cylinders are fixed by the double-head fastening nuts; water inlet pipes and water outlet pipes for the induction coils are fixed on the mounting plates, and the induction coils are cooled by using deionized water.

The compression cylinder is installed at the top of the frame, the guide sleeve II is matched with the guide post II and installed below the top of the frame, and the guide post II is connected with the output rod of the compression cylinder and fixed with the gland.

The asbestos is installed below the gland, achieves a cushioning effect, and prevents the wheel edge of the hot blank from being crushed; and the two pressure sensors are fixed below the gland, and used for detecting whether the asbestos and the gland compress the blank.

The displacement sensor I and the displacement sensor II are respectively fixed on the frame, and used for positioning the induction coils and the wheel blank.

In practical use, the wheel passes through a centering mechanism on the roller bed, then enters the induction heating device, passes through the displacement sensor II and stops on the transverse sliding tables, the positioning cylinders jack the four radial positioning blocks, the radial positioning blocks hold the wheel tightly via the interior of the lower wheel edge via the top cone at the top of the jacking cylinder, the lifting cylinders lift the wheel to separate from the roller bed, and the compression cylinder drives the gland and the asbestos to press the upper wheel edge; the servo motor drives the four jaw chuck jointly formed by the top cone, the reset springs, the radial positioning blocks, the positioning cylinders, the transverse sliding tables and the supporting plate to rotate, and the wheel is driven to rotate, so that the wheel is heated uniformly; and the induction heating cylinders drive the induction coils to approach the rim of the wheel under the action of the displacement sensor I, and the rim of the wheel is heated, so that the temperature of the rim reaches a spinning temperature.

The on-line induction heating device of the present application may realize an on-line heating function on a wheel blank in use, simultaneously has the characteristics of advanced process, high automation degree, strong generality and high safety and stability, and may realize a short wheel manufacturing flow, save the space, effectively utilize energy and improve the industrial upgrade of the wheel manufacturing industry.

Figure 1:
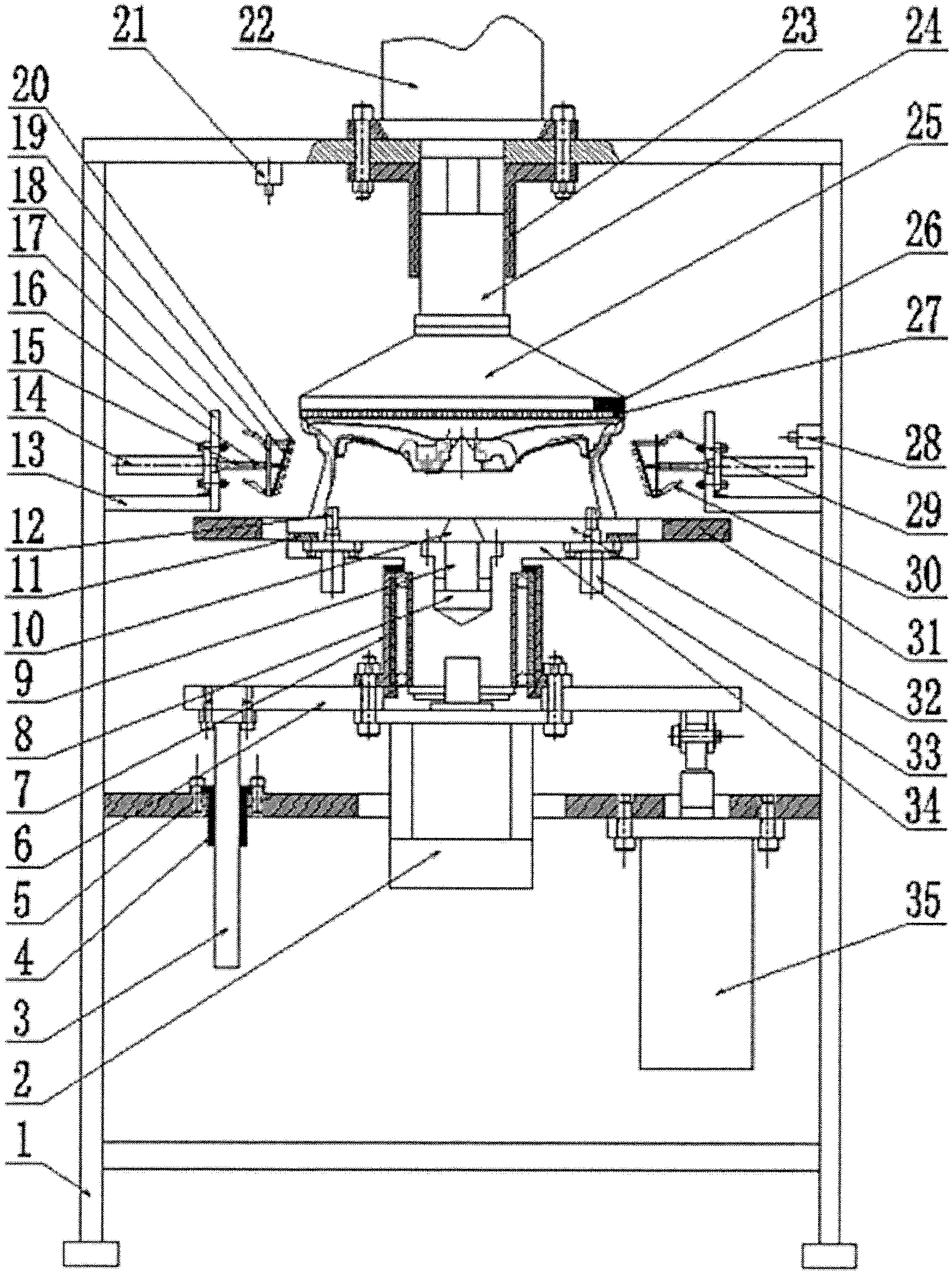
FIG. 1 is a front view of an on-line induction heating device for a wheel blank in the present application.
Figure 2:
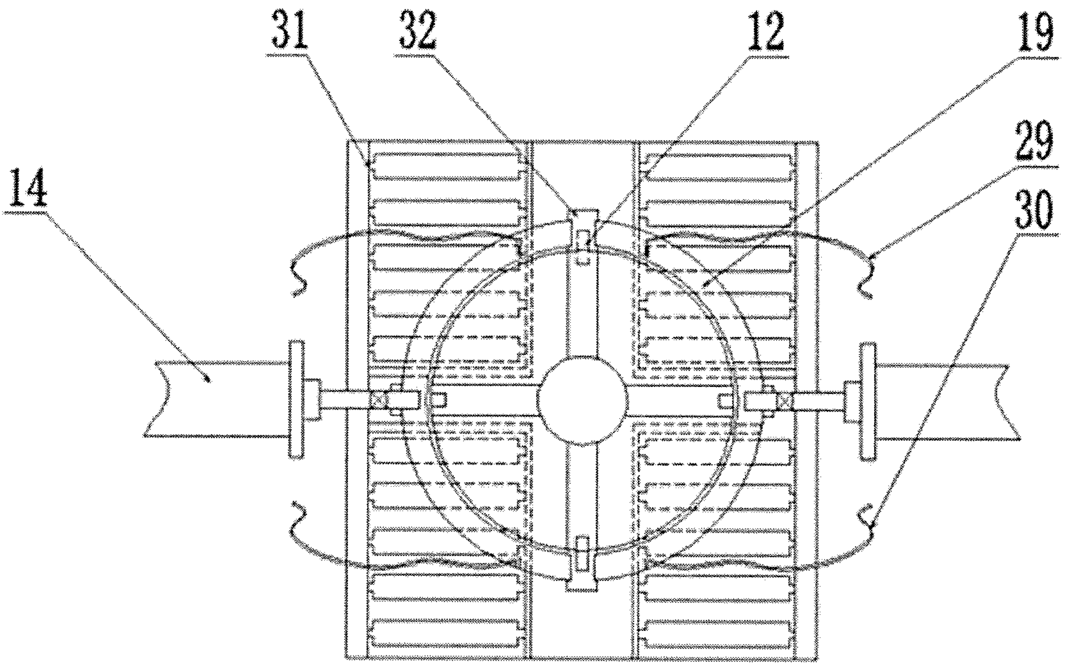
FIG. 2 is a top view when induction coils of the on-line induction heating device for a wheel blank in the present application are heated.

In figures: 1—frame, 2—servo motor, 3—guide post I, 4—guide sleeve I, 5—lower fixed plate, 6—lifting top plate, 7—bearing seat, 8—jacking cylinder, 9—piston connecting rod, 10—top cone, 11—reset spring, 12—radial positioning block, 13—upper fixed plate, 14—induction heating cylinder, 15—connecting rod, 16—double-head fastening nut, 17—fixed slide rail, 18—mounting plate, 19—outer protective jacket, 20—induction coil, 21—displacement sensor I, 22—compression cylinder, 23—guide sleeve II, 24—guide post II, 25—gland, 26—pressure sensor, 27—asbestos, 28—displacement sensor II, 29—water inlet pipe, 30—water outlet pipe, 31—roller bed, 32—transverse sliding table, 33—positioning cylinder, 34—supporting plate, 35—lifting cylinder.

DETAILED DESCRIPTION OF THE INVENTION

The details and working conditions of the specific device provided by the present application will be described below in combination with the accompanying drawings.

The device includes a frame 1, a servo motor 2, guide posts I 3, guide sleeves I 4, a lower fixed plate 5, a lifting top plate 6, a bearing seat 7, a jacking cylinder 8, a piston connecting rod 9, a top cone 10, reset springs 11, radial positioning blocks 12, upper fixed plates 13, induction heating cylinders 14, connecting rods 15, double-head fastening nuts 16, fixed slide rails 17, mounting plates 18, outer protective jackets 19, induction coils 20, a displacement sensor I 21, a compression cylinder 22, a guide sleeve II 23, a guide post II 24, a gland 25, pressure sensors 26, asbestos 27, a displacement sensor II 28, water inlet pipes 29, water outlet pipes 30, a roller bed 31, transverse sliding tables 32, positioning cylinders 33, a supporting plate 34 and lifting cylinders 35. The two lifting cylinders 35 and the two guide sleeves I 4 are fixed on the lower fixed plate 5, the output ends of the lifting cylinders 35 are articulated with the lower part of the lifting top plate 6, and the guide posts I 3 matched with the guide sleeves I 4 are fixed below the lifting top plate 6; the bearing seat 7 is fixed above the lifting top plate 6, the servo motor 2 is fixed below the lifting top plate 6, and the output end of the servo motor 2 is connected with a shaft installed in the bearing seat 7.

A four-jaw chuck jointly formed by the top cone 10, the reset springs 11, the radial positioning blocks 12, the positioning cylinders 33, the transverse sliding tables 32 and the supporting plate 34 is installed in the bearing seat 7 via a bearing; the supporting plate 34 is fixed at the upper end of the shaft, and the four transverse sliding tables 32 matched with the top cone 10 are installed above the supporting plate 34. The four reset springs 11 are installed at the tail ends of the transverse sliding tables 32; the four radial positioning blocks 12 are fixedly connected with levers of the positioning cylinders 33; the positioning cylinders 33 penetrate the supporting plate 34 and are installed on the transverse sliding tables 32, and the positions of the positioning cylinders 33 can be adjusted according to the size of the wheel; and the jacking cylinder 8 realizes synchronous action of the four radial positioning blocks 12 via motion of the piston connecting rod 9 and the top cone 10.

The left and right induction heating cylinders 14 are installed on the fixed slide rails 17, the fixed slide rails 17 are provided with hollow structures in the middle and can move up and down, and the induction heating cylinders 14 can be adjusted according to the length of the wheel rim, so that the induction coils 20 are opposite to the rim of the wheel blank. The two fixed slide rails 17 are welded with the upper fixed plates 13 together, and the upper fixed plates 13 are fixed on the frame 1.

The two induction coils 20 are respectively wound into semicircles and fixed by the semicircular outer protective jackets 19, the outer protective jackets 19 are connected with the mounting plates 18, and the connected angles can be changed to adapt to angle parallelism of the induction coils 20 and the rim; connecting rods for connecting the mounting plates 18 and the induction heating cylinders 14 are fixed by the double-head fastening nuts 16; water inlet pipes 29 and water outlet pipes 30 for the induction coils 20 are fixed on the mounting plates 18, and the induction coils 20 are cooled by using deionized water.

The compression cylinder 22 is installed at the top of the frame 1, the guide sleeve II 23 is matched with the guide post II 24 and installed below the top of the frame 1, and the guide post II 24 is connected with the output rod of the compression cylinder 22 and fixed with the gland 25.

The asbestos 27 is installed below the gland 25, achieves a cushioning effect, and prevents the wheel edge of the hot blank from being crushed; and the two pressure sensors 26 are fixed below the gland 25, and used for detecting whether the asbestos 27 and the gland 25 compress the blank.

The displacement sensor I 21 and the displacement sensor II 28 are respectively fixed on the frame 1, and used for positioning the induction coils 20 and the wheel blank.

In practical use, the wheel passes through a centering mechanism on the roller bed 31, then enters the induction heating device, passes through the displacement sensor II 28 and stops on the transverse sliding tables 32, the positioning cylinders 33 jack the four radial positioning blocks 12, the radial positioning blocks 12 hold the wheel tightly via the interior of the lower wheel edge via the top cone 10 at the top of the jacking cylinder 8, the lifting cylinders 35 lift the wheel to separate from the roller bed 31, and the compression cylinder 22 drives the gland 25 and the asbestos 27 to press the upper wheel edge; the servo motor 2 drives the four-jaw chuck jointly formed by the top cone 10, the reset springs 11, the radial positioning blocks 12, the positioning cylinders 33, the transverse sliding tables 32 and the supporting plate 34 to rotate, and the wheel is driven to rotate, so that the wheel is heated uniformly; and the induction heating cylinders 14 drive the induction coils 20 to approach the rim of the wheel under the action of the displacement sensor I 21, and the rim of the wheel is heated, so that the temperature of the rim reaches a spinning temperature.

Described above are merely preferred embodiments of the present invention, and the patent scope of the present invention is not limited thereto. Equivalent structures or equivalent process transformations made by using the specification of the present invention or contents directly or indirectly applied in other relevant technical fields fall into the patent protection scope of the present invention.

What is claimed is:

1. An on-line induction heating device for a wheel blank comprising a frame, a servo motor, guide posts I, guide sleeves I, a lower fixed plate, a lifting top plate, a bearing seat, a jacking cylinder, a piston connecting rod, a top cone, reset springs, radial positioning blocks, upper fixed plates, induction heating cylinders, connecting rods, double-head fastening nuts, fixed slide rails, mounting plates, outer protective jackets, induction coils, a displacement sensor I, a compression cylinder, a guide sleeve II, a guide post II, a gland, pressure sensors, asbestos, a displacement sensor II, water inlet pipes, water outlet pipes, a roller bed, transverse sliding tables, positioning cylinders, a supporting plate and lifting cylinders, wherein the two lifting cylinders and the two guide sleeves I are fixed on the lower fixed plate, output ends of the lifting cylinders are articulated with a lower part of the lifting top plate, and the guide posts I matched with the guide sleeves I are fixed below the lifting top plate; the bearing seat is fixed above the lifting top plate, the servo motor is fixed below the lifting top plate, and an output end of the servo motor is connected with a shaft installed in the bearing seat;

a four jaw chuck jointly formed by the top cone, the reset springs, the radial positioning blocks, the positioning cylinders, the transverse sliding tables and the supporting plate is installed in the bearing seat via a bearing; the supporting plate is fixed at an upper end of the shaft, and the four transverse sliding tables matched with the top cone are installed above the supporting plate; the four reset springs are installed at a tail ends of the transverse sliding tables; the four radial positioning blocks are fixedly connected with levers of the positioning cylinders; the positioning cylinders penetrate the supporting plate and are installed on the transverse sliding tables, and the positions of the positioning cylinders are configured to be adjusted according to size of the wheel; the jacking cylinder realizes synchronous action of the four radial positioning blocks via motion of the piston connecting rod and the top cone;

the left and right induction heating cylinders are installed on the fixed sliding rails, the fixed slide rails are provided with hollow structures in the middle and are configured to move up and down, and the induction heating cylinders are configured to be adjusted according to the length of a wheel rim, so that the induction coils are opposite to a rim of the wheel blank; the two fixed slide rails are welded with the upper fixed plates together, and the upper fixed plates are fixed on the frame;

the two induction coils are respectively wound into semicircles and fixed by the semicircular outer protective jackets, the outer protective jackets are connected with the mounting plates, and the connected angles are configured to be changed to adapt to angle parallelism of the induction coils and the rim; connecting rods for connecting the mounting plates and the induction heating cylinders are fixed by the double-head fastening nuts; water inlet pipes and water outlet pipes for the induction coils are fixed on the mounting plates, and the induction coils are cooled by using deionized water;

the compression cylinder is installed at a top of the frame, the guide sleeve II is matched with the guide post II and installed below the top of the frame, and the guide post II is connected with an output rod of the compression cylinder and fixed with the gland;

the asbestos is installed below the gland, achieves a cushioning effect, and prevents a wheel edge of a hot blank from being crushed; the two pressure sensors are fixed below the gland;

the displacement sensor I and the displacement sensor II are respectively fixed on the frame, and used for positioning the induction coils and the wheel blank.

* * * * *